US007537520B2

(12) United States Patent
Campo et al.

(10) Patent No.: US 7,537,520 B2
(45) Date of Patent: May 26, 2009

(54) MODULAR BINGO CONSOLE SYSTEM WITH MULTI-PORT COMMUNICATIONS AND MANUAL PLAY MODE

(75) Inventors: James A. Campo, Brunswick, OH (US); Louis G. Rhodes, Lakewood, OH (US); Michael J. Gallo, Twinsburg, OH (US); Brian W. Penrod, Wadsworth, OH (US); George P. Dudash, Jr., Willowick, OH (US)

(73) Assignee: Arrow International, Inc., Cleveland, OH (US)

( * ) Notice: Subject to any disclaimer, the term of this patent is extended or adjusted under 35 U.S.C. 154(b) by 910 days.

(21) Appl. No.: 10/409,718

(22) Filed: Apr. 9, 2003

(65) Prior Publication Data

US 2004/0204225 A1 Oct. 14, 2004

(51) Int. Cl.
*G06F 17/00* (2006.01)
*A63F 3/06* (2006.01)
*A63F 7/40* (2006.01)

(52) U.S. Cl. .......................... 463/19; 273/269; 463/16; 463/25; 463/46

(58) Field of Classification Search ............. 463/16-19, 463/25, 46, 42; 273/269
See application file for complete search history.

(56) References Cited

U.S. PATENT DOCUMENTS 3,300,217 A 1/1967 Franklin
4,312,511 A 1/1982 Jullien (Continued)

OTHER PUBLICATIONS

Arrow International, Inc. Arrowstar (tm) PC-2000 Bingo System Operator's Manual. 1996, p. 1-12.*

(Continued)

*Primary Examiner*—Dmitry Suhol
*Assistant Examiner*—Andrew Kim
(74) *Attorney, Agent, or Firm*—Fay Sharpe LLP

(57) ABSTRACT

A modular bingo system (A) includes a separate primary console (10) and ball console (20). The ball console (20) includes: a bingo ball chamber (22) into which a plurality of numbered bingo balls are loaded and from which the bingo balls are dispensed in an unpredictable order; a ball tray (26) into which the operator places dispensed bingo balls; a first switch matrix (70) that identifies where bingo balls have been placed in the first ball tray (26); and, a ball console computer (40) that monitors the first switch matrix (70) and transmits data regarding its state. The primary console (10) receives the data regarding the state of the first switch matrix (70) from the first ball console (20) and includes: a main computer (13) programmed to conduct bingo games; a local display (12) operatively connected to the main computer (13); an adjustable arm (11) upon which the local display (12) is supported, the adjustable arm (11) providing a plurality of degrees of freedom of movement for adjusting the position of the local display (12); an UPS (80) that provides power to the first console (10); and, a data router (30) operatively connected to the main computer (13), the data router (30) providing communications links for the exchange of data between the main computer (13), the ball console computer (40) and an external flashboard (50).

14 Claims, 4 Drawing Sheets

U.S. PATENT DOCUMENTS

| | | | |
|---|---|---|---|
| 4,332,389 | A | 6/1982 | Loyd, Jr. et al. |
| 4,661,906 | A | 4/1987 | DiFrancesco et al. |
| 4,909,516 | A | 3/1990 | Kolinsky |
| 5,011,157 | A | 4/1991 | Lovell, Sr. et al. |
| 5,178,395 | A | 1/1993 | Lovell |
| 5,718,631 | A | 2/1998 | Invencion |
| 6,168,155 | B1 | 1/2001 | Kuhlman et al. |

OTHER PUBLICATIONS

BK Entertainment Website, http://www.bingoking.com, printed Feb. 7, 2003, 7 pages.

Arrow International, Inc., http://www.arrowinternational.com/bingoequip, printed Feb. 7, 2003, 9 pages.

Arrow International, Inc., 2002 Bingo Catalog, 11 pages.

* cited by examiner

MODULAR BINGO CONSOLE SYSTEM WITH MULTI-PORT COMMUNICATIONS AND MANUAL PLAY MODE

BACKGROUND

The present invention relates to the art of games of chance. It finds particular application in conjunction with bingo games, and will be described with particular reference thereto. It is to be appreciated, however, that the invention is also amenable to other like applications.

The game of bingo and its many variations are generally known. Commonly, bingo games are conducted by charities and/or other organizations in a bingo hall or parlor with many players participating. A game operator administers the bingo games to the players and manages or regulates game play from what is known as a bingo console.

A traditional bingo console consists of a single console integrating together, among other elements, a ball chamber, an analog video camera, a ball tray, a game computer, and a local video display. At the beginning of a game, the ball chamber is typically loaded with a plurality of sequentially numbered bingo balls, e.g., either 75 or 90. A blower motor attached to chamber mixes the bingo balls with airflow. Eventually, random balls proceed in turn up a ball delivery tube from the ball chamber. As the balls are dispensed from the ball chamber, the operator retrieves the ball from the delivery tube and holds it in front of the analog video camera. The camera provides a direct analog image of the ball to one or more television (TV) monitors located in the bingo facility to provide the players with a clear view of the latest drawn random ball number. The operator then places the ball in the ball tray and calls out the ball number to the players.

The ball tray includes a number of holes or recesses corresponding to the sequentially numbered balls. Preferably, as each ball is retrieved, it is placed in its corresponding hole by the operator. Each hole is equipped with a corresponding switch. All of the switches are typically wired to form a switch matrix. The switch matrix is then cabled to the game computer that periodically scans the switch matrix to detect the insertion of a ball into one of the holes thereby activating the corresponding switch. The game computer then displays the ball number for the operator on the local video display and transmits the ball information to one or more remote Dashboards via a serial communications cable. The remote Dashboards commonly include a list or matrix of ball numbers, each one of which may be selectively illuminated to indicate to the players the status of a particular ball, i.e., already drawn or not yet drawn.

The game computer remembers all the balls drawn in a game and it sends all the ball information to the Dashboards. The Dashboards therefore indicate all of the balls that have been drawn during the game. For easy recognition, the flashboards, under the control of the game computer, are typically made to blink on and off the respective number of the latest ball drawn. Occasionally, the operator misplaces a ball in the ball tray, i.e., puts it in the wrong hole. The game computer also typically allows the operator to reset the errant ball number electronically, e.g., via a computer keyboard or display touch panel, and then re-insert the ball in the proper hole.

While the traditional bingo console generally serves its purpose well, there has heretofore been a desire for improvement. That is to say, the traditional bingo console has certain limitations which are disadvantageous in particular circumstances that commonly arise in connection with conducting bingo games.

For example, in many bingo facilities, there are multiple Dashboards and multiple TV monitors. Typically, these facilities also play two independent types of bingo games during a gaming session, e.g., so called main bingo and tear open bingo, as are known in the art. A plurality main bingo games are played during a session, but typically, only one tear open game is played during the session. The tear open game is often started at the beginning of the session and then suspended. The main bingo games are then played. Near the end of a session, the tear open game is resumed and finished. Since the tear open game is suspended and then resumed, the bingo balls that had been drawn and those that remain in the ball chamber are preferably not disturbed during play of the main bingo games. Accordingly, it would be advantageous in such situations to have two independent ball chambers and ball trays. However, in traditional bingo consoles, only one ball chamber and tray is typically provided per console, and it comes integrated with its own set of dedicated electronics, game computer, etc. Therefore, to accommodate two independent ball chambers and ball trays, an operator or organization has to buy and/or maintain two complete and distinct bingo consoles. The purchase of two bingo consoles can be a costly endeavor, particularly for a charitable organization.

Another issue that arises as the result of using two distinct bingo consoles is that the Dashboard and TV monitor connections must be switched between the consoles depending upon which game is currently being played. Traditionally, this has been accomplished with a manual, multi-pole switch.

Another exemplary limitation is that on occasion, the game or other console electronics may experience a failure and loose the memory of what balls have been drawn and/or other gaming data. This failure can result in the inability to continue with the game and may cause many players to be dissatisfied. The problem may be the result of hard disk drive failures, memory failures, display or touch screen failures, electrostatic discharge (ESD) from the operator, etc. In many cases, interruptions or disturbances on the AC power line to the game computer during gaming operations can cause the loss data. While bingo facility operators may install an external uninterruptible power supply (UPS) to power the bingo console to alleviate the power problem, that will not solve the other failure issues and a complete backup computer can be costly to implement.

Yet another potential drawback of the traditional bingo console it that the total size and weight of an integrated bingo console may be significantly difficult for installation personnel to handle and install, e.g., during loading and unloading from trucks, negotiating stairwells in a multi-story bingo facility, etc. Also, occasionally, operators take issue with the fact that the local video display, keyboard, etc. are arranged on the left or right side of a console and their location is fixed by the physical aspects of the console's construction.

The present invention contemplates a new and improved modular bingo console system which overcomes the above-referenced problems and/or others.

SUMMARY

In accordance with one aspect of the present invention, a modular bingo system is provided. It includes a separate primary console and first ball console. The first ball console at which an operator is stationed to conduct a first bingo game has opposing left and right sides on either of which the primary console is arranged to be selective positioned. The first ball console includes: a first bingo ball chamber into which a first plurality of numbered bingo balls are loaded and from which the first bingo balls are dispensed in an unpredictable order; a first ball tray into which the operator places first bingo balls dispensed from the first ball chamber, the first ball tray having a plurality of ball receiving locations corresponding to the plurality of first bingo balls, each receiving location designated for one specific numbered first bingo ball; a first switch matrix that identifies where bingo balls have been placed in the first ball tray; and, a first ball console computer that monitors the first switch matrix and transmits data regarding its state from the first ball console. The primary console receives the data regarding the state of the first switch matrix from the first ball console and includes: a main computer programmed to conduct bingo games; an input device by which the operator enters commands into the main computer; a local display operatively connected to the main computer, the local display displaying game information under the control of the main computer; an adjustable arm upon which the local display is supported, the adjustable arm providing a plurality of degrees of freedom of movement for selectively adjusting the position of the local display; an uninterruptible power supply that provides power to the first console; and, a data router operatively connected to the main computer, the data router providing communications links for the exchange of data between the main computer, the first ball console computer and an external flashboard that indicates a status of each of the plurality bingo balls.

In accordance with another aspect of the present invention, a modular bingo console system includes: a primary electronics console having a main computer programmed to manage a plurality of bingo games simultaneously, and a data router operatively connected to the main computer, the data router providing a communications link between the main computer and an external flashboard that receives from the main computer game data from one of the plurality of bingo games; and, a number of ball consoles, each ball console operative to independently conduct a separate bingo game with game data therefrom being routed to the main computer via the data router, the main computer determining which game data to forward to the flashboard.

Numerous advantages and benefits of the present invention will become apparent to those of ordinary skill in the art upon reading and understanding the present specification.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention. Note, the drawings are not to scale.

DETAILED DESCRIPTION OF PREFERRED EMBODIMENTS

Figure 1:
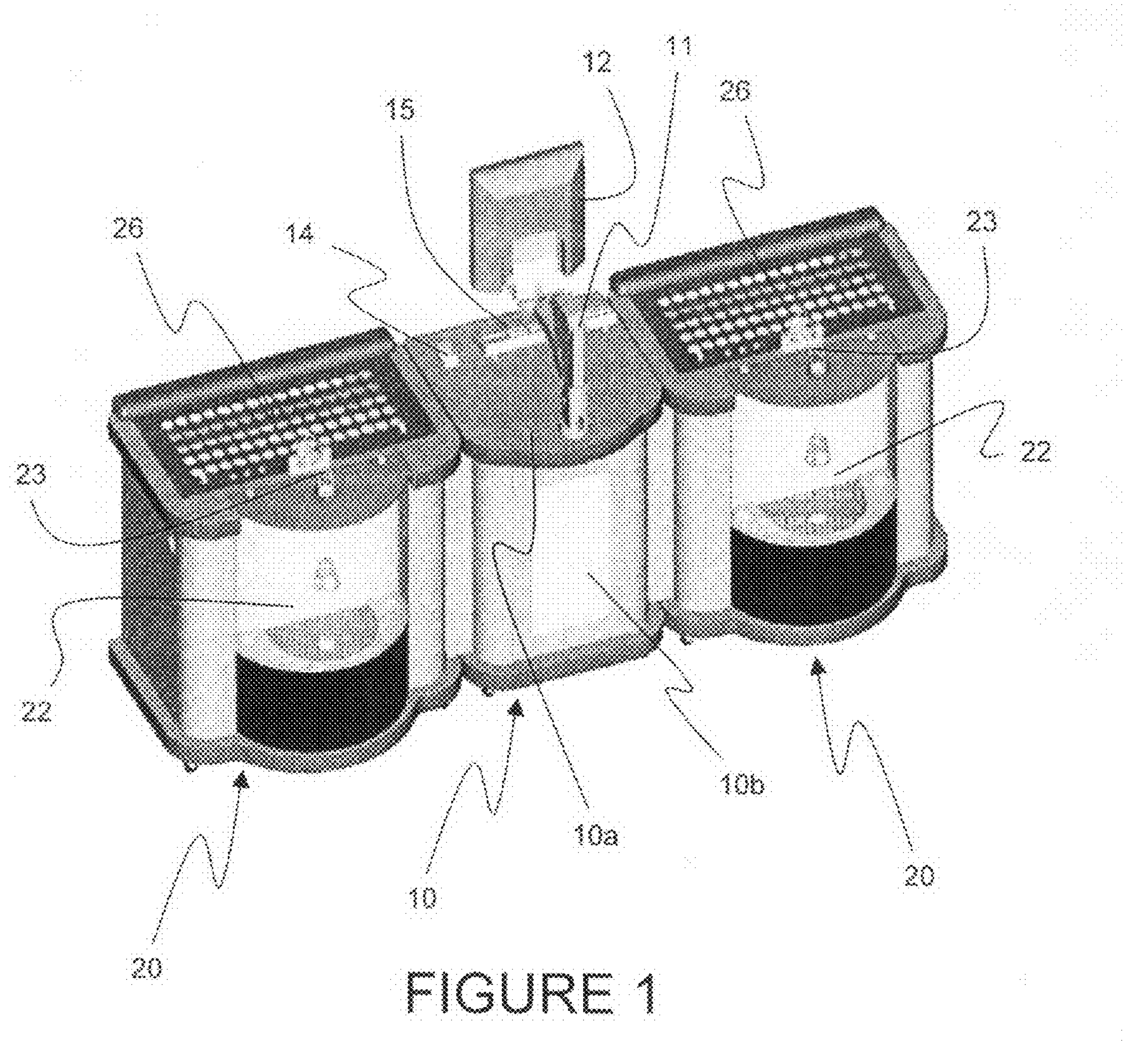
FIG. 1 is a perspective view showing an exemplary configuration of a modular bingo console system in accordance with aspects of the present invention including an exemplary electronics console and two exemplary ball consoles.
Figure 2:
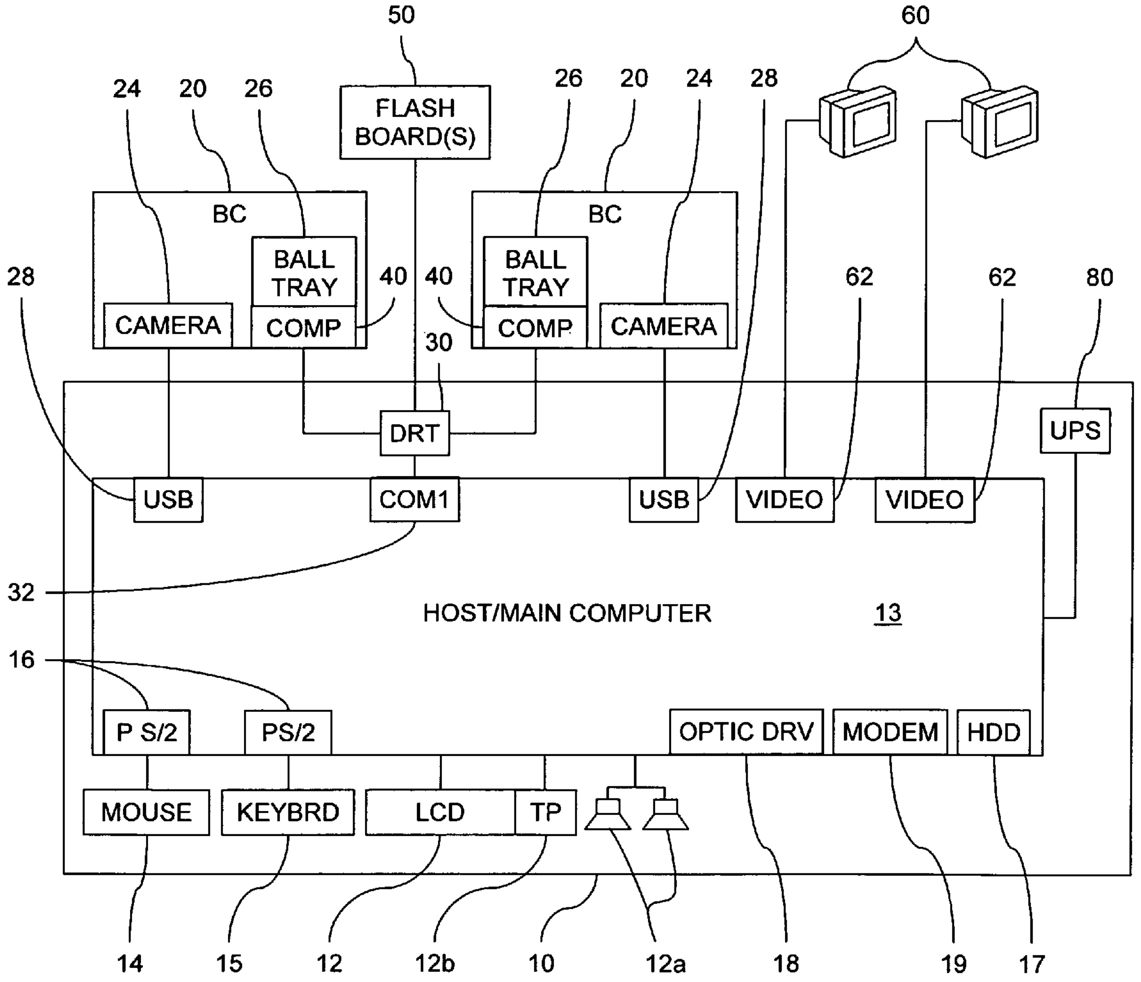
FIG. 2 is a block diagram of the electronics console shown in FIG. 1.

With reference to FIGS. 1 and 2, a modular bingo console system A include an electronics console (EC) 10 and at least one ball console (BC) 20. As illustrated, a pair of BCs 20 are shown, one on either side of the EC 10. For example, one of the BCs 20 is optionally used to play a main bingo game and the other a tear open bingo game. A swing arm 11 is mounted to a top 10*a* of the EC 10 and supports a local video display 12, e.g., a liquid crystal display (LCD) monitor. Suitably, the arm 11 provides multiple degrees of movement permitting the display 12 to be freely positioned by a game operator for comfortable viewing from a wide range of positions and/or angles. For example, the arm 11 is mounted for selective rotation right or left as desired for convenient viewing of the display 12 by the operator when located at either BC 20. Suitably, the arm 11 rotates right and left through an angle of at least a 270 degree. Similarly, the arm 11 is also selectively extendable and retractable to move the display 12 forward and backward, and the display 12 may be rotated and/or tilted on the end of the arm 11, thereby providing the operator with many degrees of freedom of motion for positioning the display 12. For example, when the operator is conducting a main bingo game on the left BC 20 he would swing the display to a convenient position while he is sitting at that console, and when conducting a tear open game on the right BC 20, he would swing the display to the other side to a convenient position for that console.

Cables (e.g., the power cord, video cables, etc.) for the display 12 are bundled and contained in a wire harness that passes through the top 10*a* of the EC 10 and routes the cables to a host or main computer 13 (see FIG. 2) and other devices situated within a housing or enclosure 10*b* of the EC 10. Optionally, the display 12 incorporates speakers 12*a* and/or a touch panel (TP) 12*b* (as shown in FIG. 2). Additionally, for entering operator input, the EC 10 is equipped with a mouse 14, keyboard 15 and/or other like input devices operatively connected with the main computer 13 (e.g., via PS/2 ports 16 or the like) and arranged atop the EC 10.

The main computer 13 is suitably equipped with a central processing unit (CPU) that controls operation thereof under the direction of appropriate programming. Additionally, the main computer 13 is also equipped with memory and/or a hard disk drive (HDD) 17 for storing the programming and/or game data.

In a suitable embodiment, the EC 10 is optionally equipped with additional peripherals operatively connected with or incorporated in the main computer 13. For example, an optical drive 18 is provided for storing gaming data that is maintained for regulatory, accounting and/or other purposes, thereby eliminating the printer and associated paper supply that is otherwise commonly used to create paper hard copies of the data. Of course, a printer may still optionally be provided. However, the optical disks employed in the optical drive 18 are capable of holding the large amounts of gaming data commonly wanted for regulatory compliance and/or accounting purposes and may be a less expensive option considering the cost of the paper supply that would otherwise be expended to print out a comparable amount of data. Additionally, the optical disks are easily transported to another office computer and automatically downloaded into an accounting software package, thereby saving a significant amount of time that would otherwise be spent manually entering the gaming data from a printed report. Optionally, the optical format or formats support by the optical drive 18 include any suitable writable or rewritable optical format as is known in the art.

Additionally, a modem 19 is also optionally provided to support communications to and/or from the EC 10 over a dial-up connection, e.g., to permit remote participation in games, to upload or otherwise submit gaming data to regulatory agencies, or other external computers, systems or networks, etc. Likewise, other wired or wireless networking interfaces as are commonly known (e.g., an Ethernet card or the like) may optionally be provided to support networking of the EC 10 and/or the main computer 13 over a local area network (LAN) or other network.

The EC 10 also suitably contains within its housing 10*b* a UPS 80, thereby relieving the gaming operator from the burden of selecting and installing external UPS equipment. The integrated UPS 80 is battery based and provides ample operation time when a line power failure occurs. This allows the main computer 13 time to shut down in an orderly manner saving selected gaming data. Gaming operations can then accurately restart where the game left off when line power is restored.

It is to be appreciated that the modular bingo console system A, in contrast to the traditional integrated bingo console, is physically split into two distinct functional components, namely, the EC 10 and the BC 20. The EC 10 is equipped with the host or main computer 13 and related equipment, and a data router and/or translator (DRT) 30. Each BC 20 is equipped with a ball chamber 22 including a blower motor (not shown), a digital video camera 24, a ball tray 26 and a BC computer 40. Notably, each individual EC 10 and/or BC 20 may be generally made smaller and/or lighter than traditional integrated consoles, and hence, installation of the system A is generally easier than installation of traditional integrated consoles.

Additionally, while the system A illustrated in FIG. 1 is configured with a pair of BCs 20 for simultaneous management of multiple games in a session, alternately for sessions in which only one game is managed at a time, the system A is optionally configured with only a single BC 20. In the single BC configuration, the EC 10 is selectively positioned to the right or left of the BC 20, thereby advantageously providing the flexibility to arrange the system A as desired, e.g., to accommodate the layout of the facility or preference of the operator.

The single EC 10 is suitably equipped to be positioned between and to operate and control two BCs 20 to achieve a cost effective approach for simultaneous management of multiple games in a session, e.g., playing main bingo games and a tear open game that has a duration spanning the play of the main bingo games. Generally, the cost and space used in this approach is less than two totally independent and duplicate traditional consoles having comparable features and quality. A further benefit of the shared EC 10 is that multiple Dashboards 50 and TV monitors 60 (see FIG. 2) in the facility are operatively connected to a single console (i.e., the EC 10) thereby eliminating the manual, multi-pole switch otherwise employed to selectively change their connection between two independent traditional consoles.

With particular reference to FIG. 2, the illustrated block diagram depicts the connectivity of the various elements of the system A. Suitably, a serial communications port (COM1) 32 on the main computer 13 provides connectivity therefrom to the DRT 30. The DRT 30 is also operatively connected to the BC computers 40 within each of the BCs 20, and to the Dashboards 50.

Figure 3:
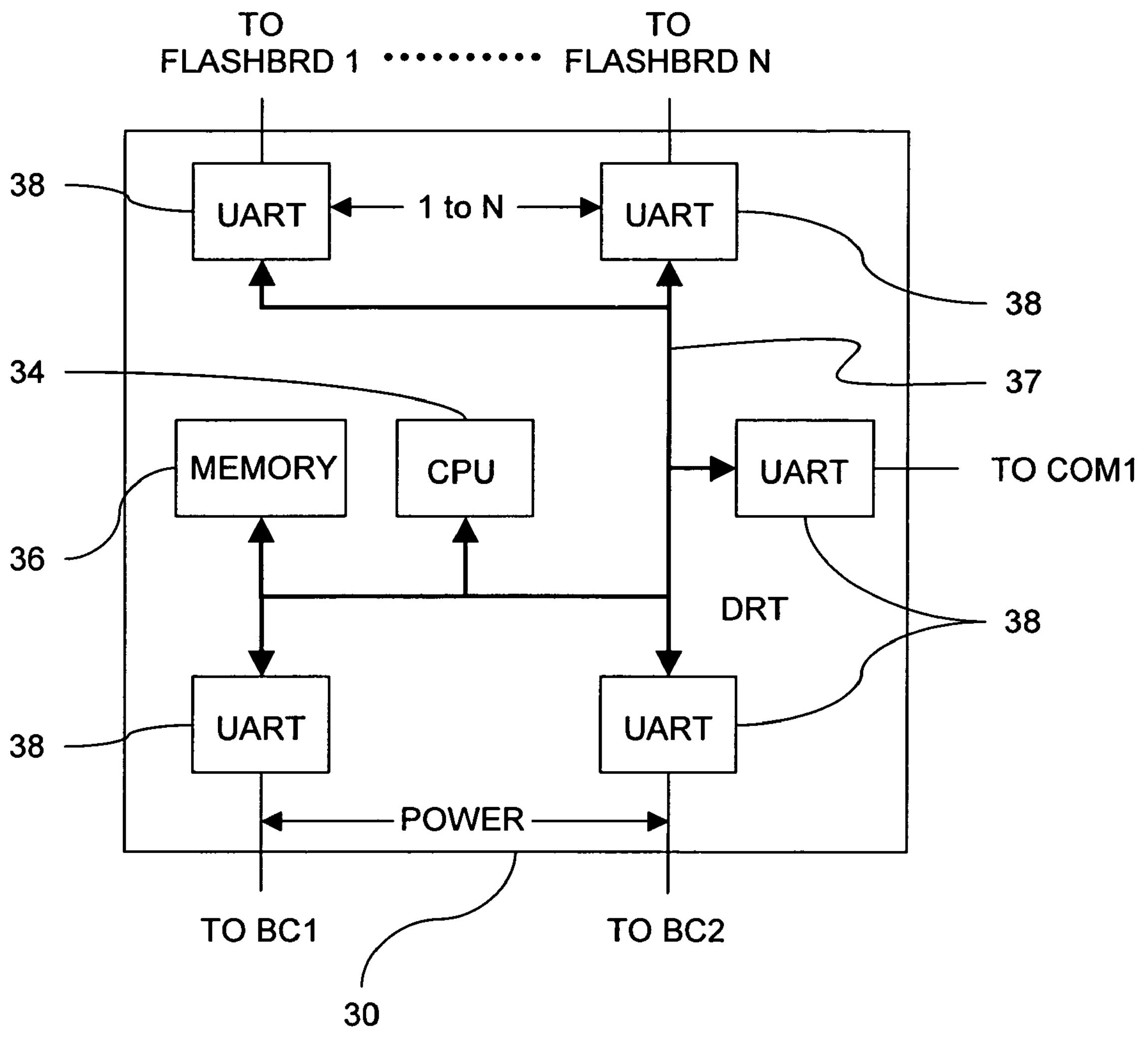
FIG. 3 is a block diagram of an exemplary data router and translator as shown in FIG. 2.

The DRT 30 is illustrated in greater detail in FIG. 3. It includes a CPU 34 that controls operation of the DRT 30 and a memory 36 that stores programming for the DRT 30 and/or other data employed thereby. A plurality of interfaces are supported on a data bus 37 to provide connectivity to the main computer 10, the BC computers 40 and the flashboards 50. Suitably, each interface is implemented as a universal asynchronous receiver-transmitter (UART) 38. Each UART 38 can process communication data independently such that the CPU 34 can be running in a multitask mode processing data in and out of the multiple UARTS 38. Additionally, the DRT 30 may provide power to BC computers 40 via the connections thereto.

Figure 4:
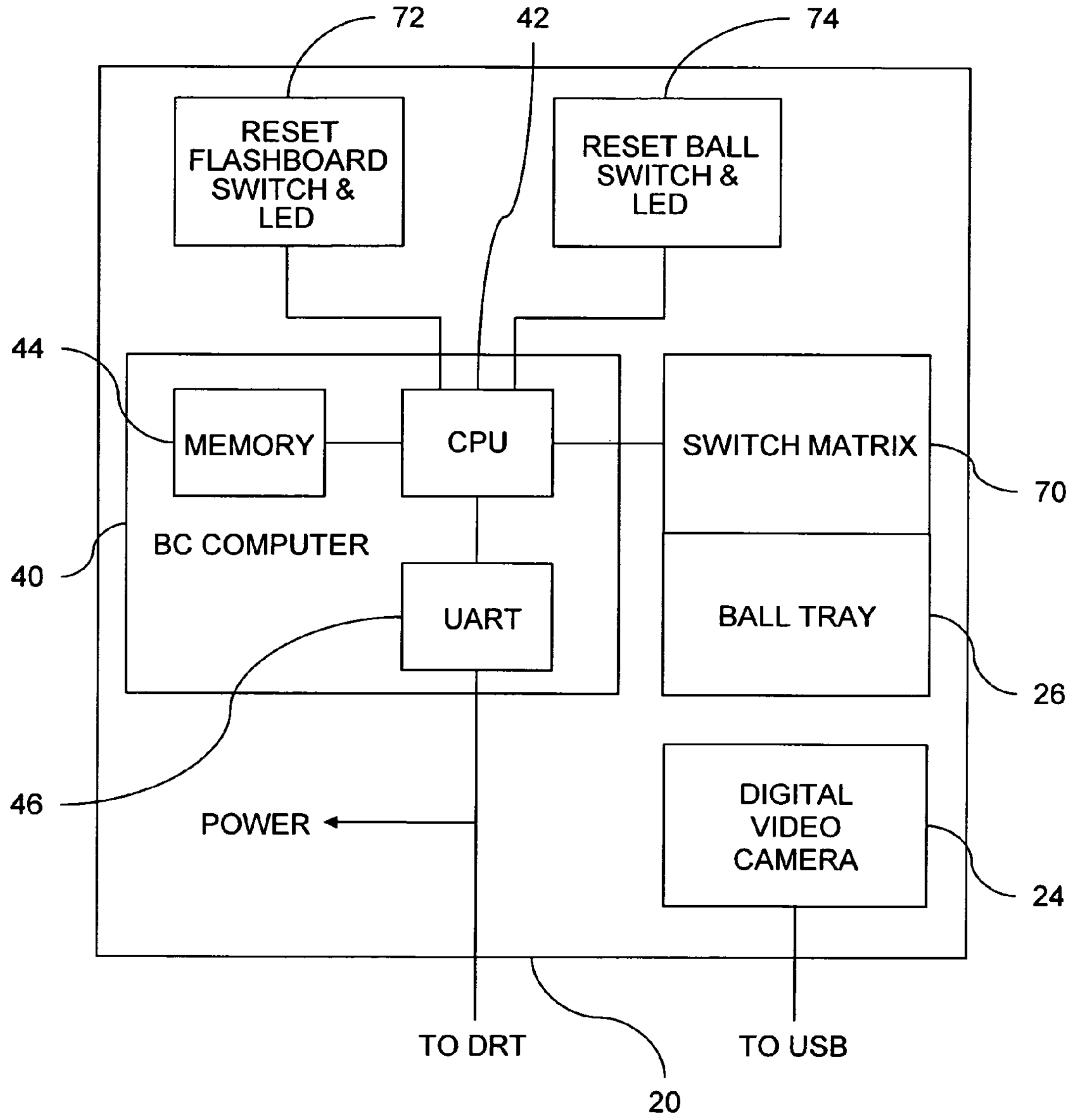
FIG. 4 is a block diagram of one of the ball consoles shown in FIG. 1.

Similarly, FIG. 4 illustrates an more detailed block diagram of the BC 20. As shown, each BC 20 is equipped with a BC computer 40 including a CPU 42 that controls operation of the BC 20, a memory 44 that stores programming for the BC computer 40 and/or other data employed by the BC 20 and a UART 46 that supports connectivity to the DRT 30.

Suitably, the DRT 30 and the BC computers 40 may be relatively less complex, less sophisticated and/or less computationally powerful compared to the main computer 13. Accordingly, while still sufficiently equipped to handle their respective tasks, they are generally more cost effective to employ. Additionally, their simplicity makes them more robust and less prone to failure due to the minimization of potential failure modes.

It is to be appreciated that the DRT 30 logically connects communications between the main computer 13 in the EC 10, each of the computers 40 incorporated in the two BCs 20, and the multiple flashboards 50 in the bingo facility. The DRT 30 provides routing of gaming data from the main computer 13 to any of the desired flashboards under dynamic software control. Additionally, via coupling with the BC computers 40, the DRT 30 supports the option for continuing a game in a manual play mode if the main computer 13 should fails. Since the DRT 30 contains no hard drives, display, touch panels, or other like failure prone devices, it is a reliable mechanism that supports fundamental gaming operations when a crisis with the main computer 13 has occurred. The communication devices in the system A (i.e., the flashboards 50, the main computer 13, and the computers 40 in the BCs 20) can all have different communication protocols and timing constraints. Accordingly, the DRT 30 also translates the protocols and data from source communication devices before sending them to destination communication devices.

In addition to game play features, the modular console system A also optionally incorporates security features to provide gaming integrity to the system A. Since the consoles are essentially programmable communications devices, it is advantageous to protect against unauthorized tampering. For example, unauthorized individuals may attempt to connect an external computer that could mischievously download viruses or like programs to mischievously alter gaming data and/or take control of gaming operations. To guard against this occurrence, the DRT 30, the EC's main computer 13 and the BC computers 40 each exchange specific security information when they first establish communications with each other. If they do not recognize the security information as being valid, they do not enter into gaming operations or receive downloads of programming or software.

Referring again to FIG. 1, a particular bingo game is played using one of the BCs 20 as follows. The ball chamber 22 on the front of the BC 20 is loaded with, scrambles and dispenses bingo balls in the usual manner. For example, at the beginning of the game, the ball chamber 22 is typically loaded with a plurality of sequentially numbered bingo balls, e.g., either 75 or 90. A blower motor (not shown), which is attached to the ball chamber 22, mixes the bingo balls with airflow. Eventually, random balls proceed in turn up a ball delivery tube 23 from the ball chamber 22.

As the balls are dispensed from the ball chamber 22, the operator retrieves the ball from the delivery tube 23 and holds it in front of the digital video camera 24 (see FIG. 2) such that a direct digital image of the ball may be obtained and routed to one or more TV monitors 60 located in the bingo facility to provide the players with a clear view of the latest drawn random ball number. Alternately, rather than removing the ball from the delivery tube 23 and holding it in front of the camera 24, the camera 24 is arranged to view the ball as it is sitting in the delivery tube 23. Suitably, each camera 24 is connected directly to a universal serial bus (USB) port 28 on the main computer 13 via a USB cable. The digital video signal is route to the TV monitors 60 from the main computer 13 through one or more video output ports 62. That is to say, depending upon which BC 20 is currently being used or active, the main computer 13 routes the digital video signal received at the corresponding port 28 to the appropriate video output port 62. It is to be appreciated that the main computer 13 is equipped to process the signals from two digital cameras 24, one in each of the two BCs 20. Since the ball image is processed in a digital format rather than as an analog signal, the main computer 13 can dynamically route, under software control, either image to the TV monitors 60 in the facility. That is to say, by analyzing the received digital signals, the main computer 13 can recognize which camera 24 is viewing a bingo ball (i.e., which BC 20 is currently being used), and supply that signal to the appropriate video output port 62. Again, this eliminates the use of manual switches otherwise employed to selectively change the TV monitor connections between two independent traditional consoles.

With added reference again to FIGS. 2 and 4, having displayed the ball's image on the TV monitors 60, the operator then places the ball in the ball tray 26 of the BC 20 being used to play the game and calls out the ball number to the players. The ball tray 26 includes a number of holes or recesses corresponding to the sequentially numbered balls. Preferably, as each ball is retrieved, it is placed in its corresponding hole by the operator. In the usual manner, each hole is equipped with a corresponding switch that is triggered when the bingo ball is placed therein, and all of the switches are wired to form a switch matrix 70.

The BC computer 40 scans the ball tray switch matrix 70 and communicates the information digitally to the DRT 30 for routing to the main computer 13. The BC computer 40 divorces the main computer 13 from understanding the hardware aspects of the switch matrix 70 and particular features of a given BC 20. Accordingly, the main computer 13 is free to devote its resources to other computationally intensive tasks, e.g., processing graphics on the local display 12 and performing other gaming functions. Conversely, while the main computer 13 focuses on these other tasks, the BC computer 40 is able to provides accurate and fast scanning of the switch matrix 70 such that a switch depression is not missed. In conjunction with the DRT 30, the BC computer 40 also supports fundamental gaming functions if the main computer 13 fails. Suitably, the programming of the BC computer 40 accommodates memory persistence (i.e., via memory 44) of all balls drawn during a game. Therefore, in the manual play mode, the BC computer 40 can indirectly drive the Dashboards 50 via the DRT communications link.

The DRT 30 also monitors communication links with the main computer 10 and the BC computers 40. The DRT 30 alerts the BC computer 40 when the main computer link has failed and the DRT 30 and BC computer 40 automatically enter the manual play mode until the main computer 13 is restored.

Regarding the manual play mode, each BC 20 is provisioned with a pair of manual pushbuttons or other like switches 72 and 74, one for resetting the entire Dashboard 50 (e.g., to start a new game) and the other for resetting individual numbers (e.g., to correct for an erroneously tripped ball tray switch as results from an accidental misplacement of a bingo ball). Suitably, each pushbutton switch 72 and 74 contains an visual indicator such as a light emitting diode (LED). The LEDs are off during normal operation and both pushbutton switches 72 and 74 are deactivated. If the main computer 13 fails, the BC computer 40 turns on both LEDs to indicate to the operator that the system A is in manual play mode and that the switches 72 and 74 are now active.

In a suitable embodiment, the DRT 30 also alerts the main computer 13 when the BC computer link fails. When this occurs, the operator uses the display touch panel 12*b*, keyboard 15 and/or mouse 14 to enter the drawn ball numbers into the main computer 13 instead of using the ball tray 26.

Regarding the manual play mode, the two pushbutton switches 72 and 74 on the BC 20 support the same. Without a functional main computer 13, the operator, while at the BC 20, is still able to activate a newly drawn ball number on the flashboard 50, reset a ball number on the flashboard 50 when an occasional error occurs as a result of placing the ball in the incorrect ball tray hole, and reset the entire Dashboard 50 for the start of a new game. Activation of a newly drawn ball number is done as normal by placing the ball in the proper ball tray hole thereby activating the switch associated with that hole. Suitably, to reset an individual ball number on the Dashboard 50, the ball reset pushbutton switch 74 is depressed, and simultaneously, the ball tray switch under the appropriate hole is also manually depressed. To reset the entire Dashboard 50, the Dashboard reset pushbutton switch 72 is depressed. To prevent inadvertent resetting of the Dashboards 50 (e.g., by accidental or otherwise unintentional momentary depressing of the flashboard reset pushbutton switch 72), the flashboard reset pushbutton switch 72 is held depressed continually for an extended period (e.g., two seconds) before the flashboard 50 is reset and the BC computer 40 erases it's called ball memory persistence for the game in progress.

The main functions preformed by the BC computer 40 are security validation when linking with the EC 10, receiving messages from the DRT 30 (including messages from the main computer 13 routed through the DRT 30), decoding and acting upon commands received, scanning the switch matrix 70 and detecting a change of state in a ball tray switch from the previous scan, transmitting the change of state information to the DRT 30 in two different manners depending on if in manual play mode or normal play mode, scanning the two manual pushbutton switches 72 and 74 during manual play mode, and maintaining called ball memory persistence during a game. Examples of the commands and data exchanged between the DRT 30 and the BC computer 40 include: normal/manual mode state information; a data frame with ball state information sent to and/or from the DRT 30; a command to reset the drawn ball history maintained by the BC 20; a command to pre-set the drawn ball history in the BC 20 to a known state; a request for the state of the drawn ball history in the BC 20; and other appropriate command and/or control signaling, other data, and/or other communications that suitably support the operations and/or functionality described.

To further appreciate the operation and/or capabilities of the system A, consider the following exemplary game session including main bingo and tear open games conducted with the system A. For purposes of this example, BC1 shall be used to referred to the BC 20 upon which the main bingo game is being conducted, and BC2 shall be used to referred to the BC 20 upon which the tear open bingo games is being conducted. While the following describes operation of the system A via the communication connections illustrated in FIGS. 2-4 for this exemplary gaming session, it is to be understood that the operation is readily adapted to various other types of bingo game sessions as will be readily apparent to those of ordinary skill in the art.

The main computer 13, DRT 30, and each BC computer 40 establish communications when the system A is first activated. Security information is validated between them to safeguard against establishing communications with an unwanted computer or device. Game play is then ready to being.

Assuming the main bingo game is currently being played, the operator operates BC1 to provide random ball delivery therefrom, and places a drawn ball in the corresponding ball tray hole activating the associated ball tray switch. The BC1 computer 40 is continuously scanning the entire ball tray switch matrix 70 and detects the closed switch. The BC1 computer 40 updates the BC1 memory 44 to indicate that the ball has been drawn, then it sends a message to the DRT 30 informing the DRT 30 of the number of the ball switch that had been closed. The DRT 30 receives and acknowledges the message to the BC1 computer 40. The DRT 30 then interprets the message and using a defined routing path to a destination device, translates the message to a format understood by the destination device, in this case, the main computer 13. The DRT 30 then sends the message to the main computer 13, the message containing the source address of BC1, and the main computer 13 acknowledges receipt of the message to the DRT 30. The main computer 13 accepts the data from the BC1 address and updates its program data with the ball information and then sends a message to the DRT 30 to route the drawn ball number to the appropriate flashboard 50, using a destination address corresponding thereto. The DRT 30 then translates the message into a format understood by the flashboard destination device and then transmits the message to the flashboard 50.

In the meantime, a second ball arrives in the BC1 ball delivery tube 23 and is sitting in front of the BC1 camera 24. The main computer 13 then displays the live digital video image of the ball on the local display 12 and also routes the live digital video image to the video output 62 that is connected with the TV monitor 60 on which the image is displayed.

Suitably, the ball image displayed is that of the next ball to arrived in the ball delivery tube 23, rather than the first ball that was just processed into the BC1 ball tray 26 and sent to the flashboards 50. Some variations of this process are desirable to some operators. For example, sometimes when the ball is still in front of the camera 24, the operator will call out the ball number and use his finger to immediately activate the switch in the ball tray hole before removing the ball from in front of the camera 24. This puts the ball image, the called ball, and the Dashboard update all in synchronization. It also allows systems that are radio frequency (RF) or otherwise wireless enabled to immediately transmit the ball to the remote electronic gaming devices with the same degree of synchronization.

When the operator desires to switch from the main bingo game to the tear open game, he enters an indication of the same into the main computer 13 using one or more of the EC's input devices, e.g., the touch panel 12*b*, the keyboard 15 and/or the mouse 14. From this point on, the main computer 13 ignores data associated with the BC1 source address and then accepts the BC2 source address data on the COM1 port 32. The routing path for what particular Dashboards receive the BC2 data are optionally different than the Dashboard path when the main bingo game was in progress. The main computer 13 simply sends different Dashboard destination addresses to the DRT 30 for each game type.

In the event the main computer link to the DRT 30 fails, the DRT 30 automatically changes its destination routing path from the main computer 13 to a pre-determined set of Dashboards. It then sends an informative message to the BC1 and BC2 computers 40 prompting the BCs to enable the manual play pushbuttons 72 and 74 and activate their associated LEDs. The fact that the BC computer 40 has previous ball memory, allows it to continue with the game as new balls are drawn. A new ball can be set via the ball tray 26, and an individual ball can be reset and/or the entire Dashboard 50 can be reset via the two pushbutton switches 72 and 74 as previously described. When the BC computer 40 sends new ball information to the DRT 30, the DRT 30 will translate it and then route it directly to the proper Dashboards 50. Suitably, the game is completed and then an attempt to restore the main computer 13 is made. If the main computer 13 is not recoverable, new games and the entire gaming session may still continue with fundamental bingo operations in tact. Notably, the tear open game is also able to be conducted in the manual play mode. The operator simply leaves the BC1 and goes to the BC2 and starts playing the tear open game. The DRT 30 sees the data from BC2 and routes the data to the proper Dashboards 50. Suitably, the default Dashboard routing path in the manual play mode is different for BC1 and BC2.

Suitably, if the main computer 13 is recovered after a fault has occurred, the main computer 13 reads the current state of the called ball history from the BC computer 40, or resets the BC state to a new game, or initialize the BC drawn ball history to a new set of values.

Since the DRT 30 supplies power to the BC computer 40, the DRT 30 also has the ability to switch power on and off to the BC computer 40. When the DRT 30 detects that the BC computer link is not responding, it can power cycle the BC computer 40 which effectively resets the BC computer 40 causing it to re-enter the security check sequence and re-establish communications with the DRT 30.

It is to be appreciated that the BC 20 may optionally be used without the EC 10. The manual play mode of the BC 20 allows it to send data to any suitable host computer or in a small facility, directly to a Dashboard 50. In this case being that the DRT 30 is unavailable for data translation, the BC computer 40 is programmed to send the data in the flashboard's native data format. Further, it is also to be appreciated that the EC 10 may optionally be used without a BC 20. In this case, the EC 10 is equipped or otherwise employs a random number generator to acquire a random ball number instead of receiving the ball number from the BC 20 while all other EC operations remain the same.

There are several other logical variations of the modular console system invention disclosed herein. One such variation concerns the DRT and communications means. The DRT may not be a physically separate device from the main computer. Alternately, it could be a board that plugs into an expansion slot within a high-speed main computer housing. Expanding on that concept, the plug in board could utilize the CPU and memory element of the main computer in lieu of the separate DRT CPU and memory elements. The logical tasks of DRT routing and translation functions with the modular console system are not materially altered. High-speed wireless communications have become reliable and cost effective. Yet another logical variation is that communication between the DRT and main computer, and between the DRT and the ball consoles can be wireless in any combination thereof.

Camera communications of digital images are also available in a wireless configuration that could be employed between the ball console and main computer. Alternately, the camera can have wired interfaces other than USB as described in this embodiment, such as Firewire and other common wired interfaces to the main computer.

The invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A modular bingo system comprising:

a first ball console module at which an operator is stationed to conduct a first bingo game, said first ball console module having opposing left and right sides and including:

first bingo ball chamber into which a first plurality of numbered bingo balls are loaded and from which the first bingo balls are dispensed in an unpredictable order;

a first ball tray into which the operator places first bingo balls dispensed from the first ball chamber, the first ball tray having a plurality of ball receiving locations corresponding to the plurality of first bingo balls, each receiving location designated for one specific numbered first bingo ball;

a first switch matrix that identifies where bingo balls have been placed in the first ball tray; and, a first ball console computer that monitors the first switch matrix and transmits data regarding its state from the first ball console module; and, a primary console module separate and distinct from the first ball console module, said primary console module arranged to be selectively positioned on either side of the first ball console module, said primary console module receiving the data regarding the state of the first switch matrix from the first ball console module and including:

a main computer distinct from said first ball console computer and operatively connected thereto, said main computer programmed to conduct a bingo game;

an input device by which the operator enters commands into the main computer;

a local display operatively connected to said main computer; said local display displaying game information under the control of said main computer;

a holder upon which the local display is supported, said holder providing a plurality of degrees of freedom of movement for selectively adjusting the position of the local display relative to the primary console; and, a data router operatively connected to the main computer, said data router providing communications links for the exchange of data between the main computer, the first ball console computer and a remote display indicating gaming data, wherein the data router monitors the communications link with the main computer such that if the communications link with the main computer fails, then in response thereto the data router: (i) produces a signal sent to the first ball console computer to automatically place the first ball console module in the manual play mode; and (ii) routes data regarding the state of the first switch matrix from the first ball console module to the remote display wherein the data router also provides power from the primary console module to the first ball console computer, wherein the data router comprises:

a central processing unit that controls operation of the data router under the direction of programming stored in a memory;

a plurality of interfaces providing connectivity to the main computer, the first ball console computer and the flashboard; and, a data bus upon which the interfaces are operatively supported.

2. The modular bingo system of claim 1, wherein the first ball console is operative in a manual play mode and further includes:

a manual ball reset switch by which the operator selectively resets the status of a single bingo ball indicated on the remote display; and, a manual board reset switch by which the operator selectively resets the status of all the bingo balls indicated on the remote display.

3. The modular bingo system of claim 2, wherein the manual reset switches are inoperative when the first ball console is not in the manual play mode, and they further include:

an indicator that indicates when the manual reset switches are operative and the first ball console is in the manual play mode.

4. The modular bingo console system of claim 1, wherein the primary electronics console is equipped with an uninterruptible power supply that powers the primary electronic console in event of a power failure from a line source of power, said uninterruptible power supply having enough power to run the primary electronics console until an orderly shut down of the main computer is completed.

5. The modular bingo console system of claim 1, wherein each ball console further includes:

a memory in which is maintain a history of numbers drawn in a bingo game being conducted on that ball console module.

6. The modular bingo console system of claim 1, wherein the main computer has an optical drive.

7. A modular bingo system comprising:

a first ball console module at which an operator is stationed to conduct a first bingo game, said first ball console module having opposing left and right sides and including:

a first bingo ball chamber into which a first plurality of numbered bingo balls are loaded and from which the first bingo balls are dispensed in an unpredictable order;

a first ball tray into which the operator places first bingo balls dispensed from the first ball chamber, the first ball tray having a plurality of ball receiving locations corresponding to the plurality of first bingo balls, each receiving location designated for one specific numbered first bingo ball;

a first switch matrix that identifies where bingo balls have been placed in the first ball tray; and, a first ball console computer that monitors the first switch matrix and transmits data regarding its state from the first ball console module; and, a primary console module separate and distinct from the first ball console module, said primary console module arranged to be selectively positioned on either side of the first ball console module, said primary console module receiving the data regarding the state of the first switch matrix from the first ball console module and including:

a main computer distinct from said first ball console computer and operatively connected thereto, said main computer programmed to conduct a bingo game;

an input device by which the operator enters commands into the main computer;

a local display operatively connected to said main computer; said local display displaying game information under the control of said main computer; and, a data router operatively connected to the main computer, said data router providing communications links for the exchange of data between the main computer, the first ball console computer and a remote display indicating gaming data, wherein the data router monitors the communications link with the main computer such that if the communications link with the main computer fails, then in response thereto the data router: (i) produces a signal sent to the first ball console computer to automatically place the first ball console module in the manual play mode: and (ii) routes data regarding the state of the first switch matrix from the first ball console module to the remote display, wherein the data router also provides power from the primary console module to the first ball console computer, wherein the data router comprises:

a central processing unit that controls operation of the data router under the direction of programming stored in a memory;

a plurality of interfaces providing connectivity to the main computer, the first ball console computer and the flash board; and, a data bus upon which the interfaces are operatively supported.

8. The modular bingo system of claim 7, further comprising:

second ball console module for conducting a second bingo game simultaneously with the first bingo game, said second ball console module including:

a second bingo ball chamber into which a second plurality of numbered bingo balls are loaded and from which the second bingo balls are dispensed in an unpredictable order;

a second ball tray into which the operator places bingo balls dispensed from the second ball chamber, the second ball tray having a plurality of ball receiving locations corresponding to the plurality of second bingo balls, each receiving location designated for one specific numbered second bingo ball;

a second switch matrix that identifies where bingo balls have been placed in the second ball tray; and, a second ball console computer distinct from said main computer and said first ball console computer, said second ball console computer monitoring the second switch matrix and transmitting data regarding its state from the second ball console to the primary console;

wherein said second ball console module is separate and distinct from the primary console module and the first ball console module, said data router also providing communication links between the main computer, the second ball console and the remote display, and wherein said main computer controls the remote display to reflect at least one of the first bingo game being conducted at the first ball console or the second bingo game being conducted at the second ball console.

9. The modular bingo system of claim 8, wherein the first ball console further includes a first digital video camera arranged to view bingo balls dispensed from the first ball chamber, said first camera relaying first digital images to the main computer; and said second ball console module further includes a second digital video camera arranged to view bingo balls dispensed from the second ball chamber, said second camera relaying second digital images to the main computer.

10. The modular bingo system of claim 9, wherein the main computer processes the first and second digital images and routes that corresponding game operative digital image to a video output port that supplies it to an external television monitor.

11. The modular bingo console system of claim 7, wherein the primary console module is equipped with an uninterruptible power supply that powers the primary console module in event of a power failure from a line source of power, said uninterruptible power supply having enough power to run the primary console module until an orderly shut down of the main computer is completed.

12. The modular bingo system of claim 7, wherein the data router further translates communications between the main computer, the first ball console computer and the flashboard when the communication protocols are different for any two that are communicating.

13. The modular bingo system of claim 7, wherein the first ball console further comprises:

a memory in which the current state of the first switch matrix is maintained.

14. The modular bingo system of claim 7, wherein the main computer is equipped with an optical drive for storing game data.

* * * * *